US012647603B2

(12) United States Patent
Jang et al.

(10) Patent No.: US 12,647,603 B2
(45) Date of Patent: Jun. 2, 2026

(54) IMAGE ENCODING/DECODING METHOD AND APPARATUS BASED ON MVD CODE PREDICTION, AND RECORDING MEDIUM STORING BITSTREAM

(71) Applicant: LG Electronics Inc., Seoul (KR)

(72) Inventors: Hyeong Moon Jang, Seoul (KR); Jung Hak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/854,846

(22) PCT Filed: Apr. 12, 2023

(86) PCT No.: PCT/KR2023/004926
§ 371 (c)(1),
(2) Date: Oct. 7, 2024

(87) PCT Pub. No.: WO2023/200243
PCT Pub. Date: Oct. 19, 2023

(65) Prior Publication Data
US 2025/0358441 A1      Nov. 20, 2025

Related U.S. Application Data

(60) Provisional application No. 63/330,270, filed on Apr. 12, 2022.

(51) Int. Cl.
*H04N 19/513*          (2014.01)
*H04N 19/132*          (2014.01)
(Continued)

(52) U.S. Cl.
CPC ......... *H04N 19/521* (2014.11); *H04N 19/132* (2014.11); *H04N 19/159* (2014.11); *H04N 19/176* (2014.11)

(58) Field of Classification Search
CPC .. H04N 19/521; H04N 19/132; H04N 19/159; H04N 19/176
See application file for complete search history.

(56) References Cited

U.S. PATENT DOCUMENTS

2020/0404311 A1    12/2020  Filippov et al.
2022/0053206 A1*    2/2022  Ko .......................... H04N 19/52
(Continued)

FOREIGN PATENT DOCUMENTS

KR      10-2020-0066737 A      6/2020
KR      10-2020-0128586 A      11/2020
KR      10-2022-0030988 A      3/2022

OTHER PUBLICATIONS

International Search Report and Written Opinion in International Appln. No. PCT/KR2023/004926, mailed on Jul. 14, 2023, 11 pages (with partial English translation).
(Continued)

*Primary Examiner* — Boubacar Abdou Tchoussou
(74) *Attorney, Agent, or Firm* — Fish & Richardson P.C.

(57) ABSTRACT

An image encoding/decoding method and apparatus are provided. The image decoding method may comprise determining a motion vector difference (MVD) of a current block, deriving a motion vector of the current block based on the determined MVD and a motion vector predictor (MVP) of the current block, and generating a prediction sample of the current block based on the derived motion vector and a reference picture of the current block. A sign of the MVD may be determined whether the reference picture is resampled.

15 Claims, 13 Drawing Sheets

(51) Int. Cl.
H04N 19/159 (2014.01)
H04N 19/176 (2014.01)

(56) References Cited

U.S. PATENT DOCUMENTS

2023/0094825 A1* 3/2023 Zhang .................... H04N 19/52
                                                        375/240.02
2024/0364865 A1* 10/2024 Deng ................... H04N 19/176

OTHER PUBLICATIONS

Zhang et al., "Non-EE2: On MVD sign prediction," JVET-X0132-v1, Joint Video Experts Team (JVET) of ITU-T SG 16 WP 3 and ISO/IEC JTC 1/SC 29, 24th Meeting, by teleconference, Oct. 6-15, 2021, 4 pages.

* cited by examiner

PREDICTION MODE
DETERMINATION UNIT

ORIGINAL PICTURE

PREDICTION MODE INFORMATION
INFORMATION REGARDING
MOTION INFORMATION

182

MOTION INFORMATION
DERIVATION UNIT

REFERENCE PICTURE

183

PREDICTION SAMPLE

PREDICTION SAMPLE
DERIVATION UNIT

INTER PREDICTION UNIT

FIG. 5

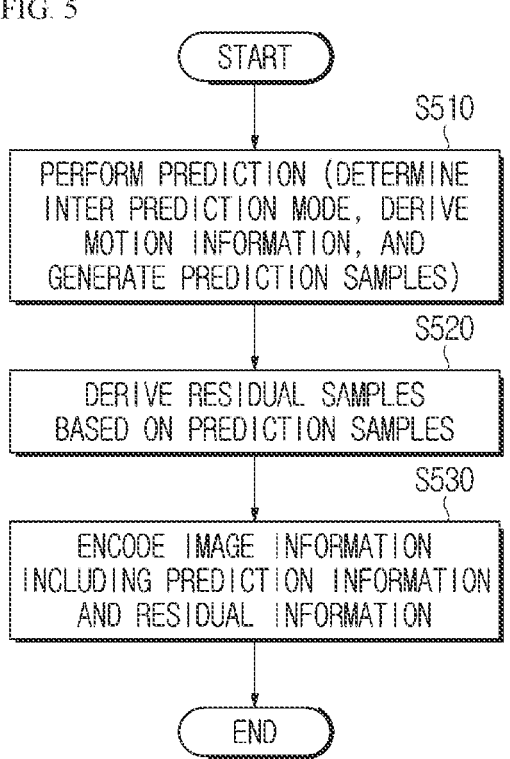

START

S510

PERFORM PREDICTION (DETERMINE
INTER PREDICTION MODE, DERIVE
MOTION INFORMATION, AND
GENERATE PREDICTION SAMPLES)

S520

DERIVE RESIDUAL SAMPLES
BASED ON PREDICTION SAMPLES

S530

ENCODE IMAGE INFORMATION
INCLUDING PREDICTION INFORMATION
AND RESIDUAL INFORMATION

END

List-0 reference picture | Current picture | List-1 reference picture

Reference picture | Current picture

FIG. 16

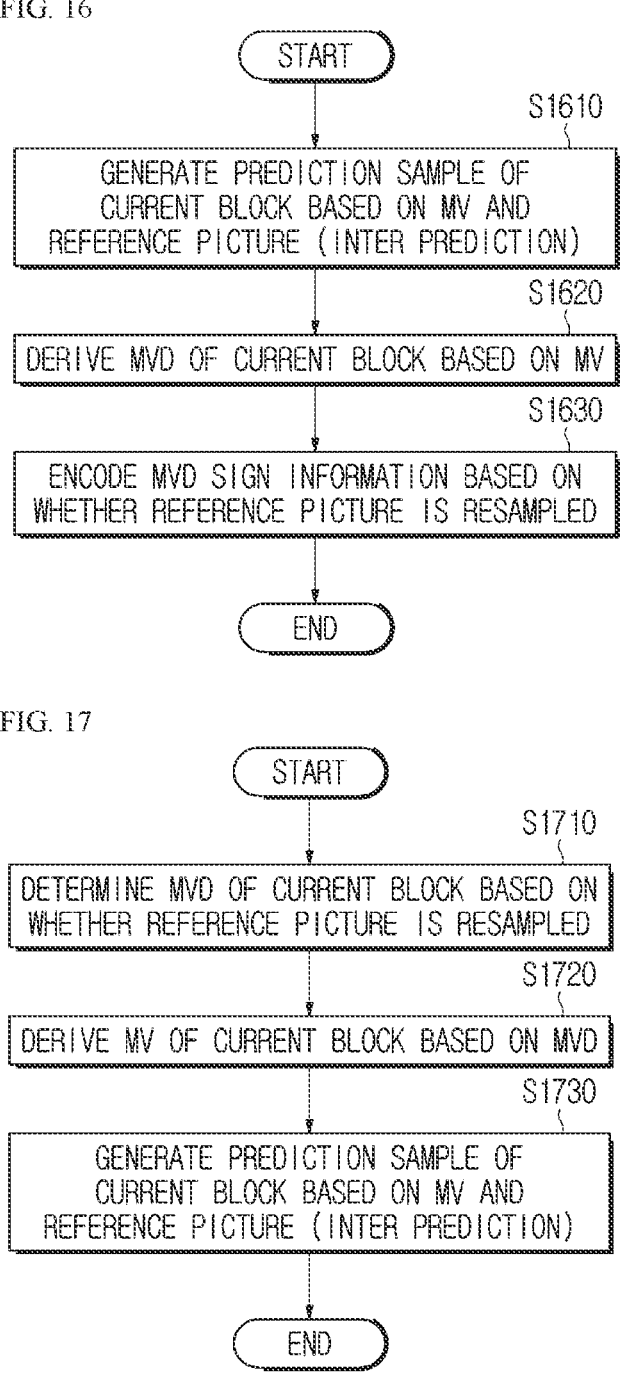

S1610

GENERATE PREDICTION SAMPLE OF CURRENT BLOCK BASED ON MV AND REFERENCE PICTURE (INTER PREDICTION)

S1620

DERIVE MVD OF CURRENT BLOCK BASED ON MV

S1630

ENCODE MVD SIGN INFORMATION BASED ON WHETHER REFERENCE PICTURE IS RESAMPLED

FIG. 17

START

S1710

DETERMINE MVD OF CURRENT BLOCK BASED ON WHETHER REFERENCE PICTURE IS RESAMPLED

S1720

DERIVE MV OF CURRENT BLOCK BASED ON MVD

S1730

GENERATE PREDICTION SAMPLE OF CURRENT BLOCK BASED ON MV AND REFERENCE PICTURE (INTER PREDICTION)

END

FIG. 18

IMAGE ENCODING/DECODING METHOD AND APPARATUS BASED ON MVD CODE PREDICTION, AND RECORDING MEDIUM STORING BITSTREAM

CROSS-REFERENCE TO RELATED APPLICATIONS

This application is a National Stage application under 35 U.S.C. § 371 of International Application No. PCT/KR2023/004926, filed on Apr. 12, 2023, which claims the benefit of U.S. Provisional Application No. 63/330,270, filed on Apr. 12, 2022. The disclosures of the prior applications are incorporated by reference in their entirety.

TECHNICAL FIELD

The present disclosure relates to an image encoding/decoding method and apparatus and a recording medium for storing a bitstream and, more particularly, to an image encoding and decoding method and apparatus based on MVD sign prediction, and a recording medium for storing a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus that performs adaptive MVD sign prediction based on whether a reference picture is resampled.

Another object of the present disclosure is to provide an image encoding/decoding method and apparatus that performs MVD sign prediction only when a reference picture is not resampled.

Another object of the present disclosure is to provide an image encoding/decoding method and apparatus that derives an MVD sign from a predefined MVD sign list when a reference picture is resampled.

Another object of the present disclosure is to provide a non-transitory computer-readable recording medium for storing a bitstream generated by an image encoding method or apparatus according to the present disclosure.

Another object of the present disclosure is to provide a non-transitory computer-readable recording medium storing a bitstream received, decoded and used to reconstruct an image by an image decoding apparatus according to the present disclosure.

Another object of the present disclosure is to provide a method of transmitting a bitstream generated by an image encoding method or apparatus according to the present disclosure.

The technical problems solved by the present disclosure are not limited to the above technical problems and other technical problems which are not described herein will become apparent to those skilled in the art from the following description.

Technical Solution

An image decoding method according to an aspect of the present disclosure may comprise determining a motion vector difference (MVD) of a current block, deriving a motion vector of the current block based on the determined MVD and a motion vector predictor (MVP) of the current block, and generating a prediction sample of the current block based on the derived motion vector and a reference picture of the current block. A sign of the MVD may be determined whether the reference picture is resampled.

An image decoding apparatus according to another aspect of the present disclosure may comprise a memory and at least one processor. The at least one processor may determine a motion vector difference (MVD) of a current block, derive a motion vector of the current block based on the determined MVD and a motion vector predictor (MVP) of the current block, and generate a prediction sample of the current block based on the derived motion vector and a reference picture of the current block. A sign of the MVD may be determined whether the reference picture is resampled.

An image encoding method according to another aspect of the present disclosure may comprise generating a prediction sample of a current block based on a motion vector and reference picture of the current block, deriving a motion vector difference (MVD) of the current block, based on the motion vector and a motion vector predictor (MVP) of the current block, and encoding inter prediction information including information about a magnitude and sign of the MVD. Information about the sign of the MVD may be determined whether the reference picture is resampled.

A computer-readable recording medium according to another aspect of the present disclosure can store a bitstream generated by an image encoding method or apparatus of the present disclosure.

A transmission method according to another aspect of the present disclosure can transmit a bitstream generated by an image encoding method or apparatus of the present disclosure.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

According to the present disclosure, it is possible to provide an image encoding/decoding method and apparatus that performs adaptive MVD sign prediction based on whether a reference picture is resampled.

According to the present disclosure, it is possible to provide an image encoding/decoding method and apparatus that performs MVD sign prediction only when a reference picture is not resampled.

According to the present disclosure, it is possible to provide an image encoding/decoding method and apparatus that derives an MVD sign from a predefined MVD sign list when a reference picture is resampled.

Also, according to the present disclosure, it is possible to provide a non-transitory computer-readable recording medium for storing a bitstream generated by an image encoding method or apparatus according to the present disclosure.

Also, according to the present disclosure, it is possible to provide a non-transitory computer-readable recording medium storing a bitstream received, decoded and used to reconstruct an image by an image decoding apparatus according to the present disclosure.

Also, according to the present disclosure, it is possible to provide a method of transmitting a bitstream generated by an image encoding method or apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

DESCRIPTION OF DRAWINGS

FIG. 4 is a diagram schematically showing an inter prediction unit 180 of an image encoding apparatus 10X).

FIG. 5 is a flowchart illustrating a method of encoding an image based on inter prediction.

FIG. 16 is a flowchart illustrating an image encoding method according to an embodiment of the present disclosure.

FIG. 17 is a flowchart illustrating an image decoding method according to an embodiment of the present disclosure.

Figure 18:
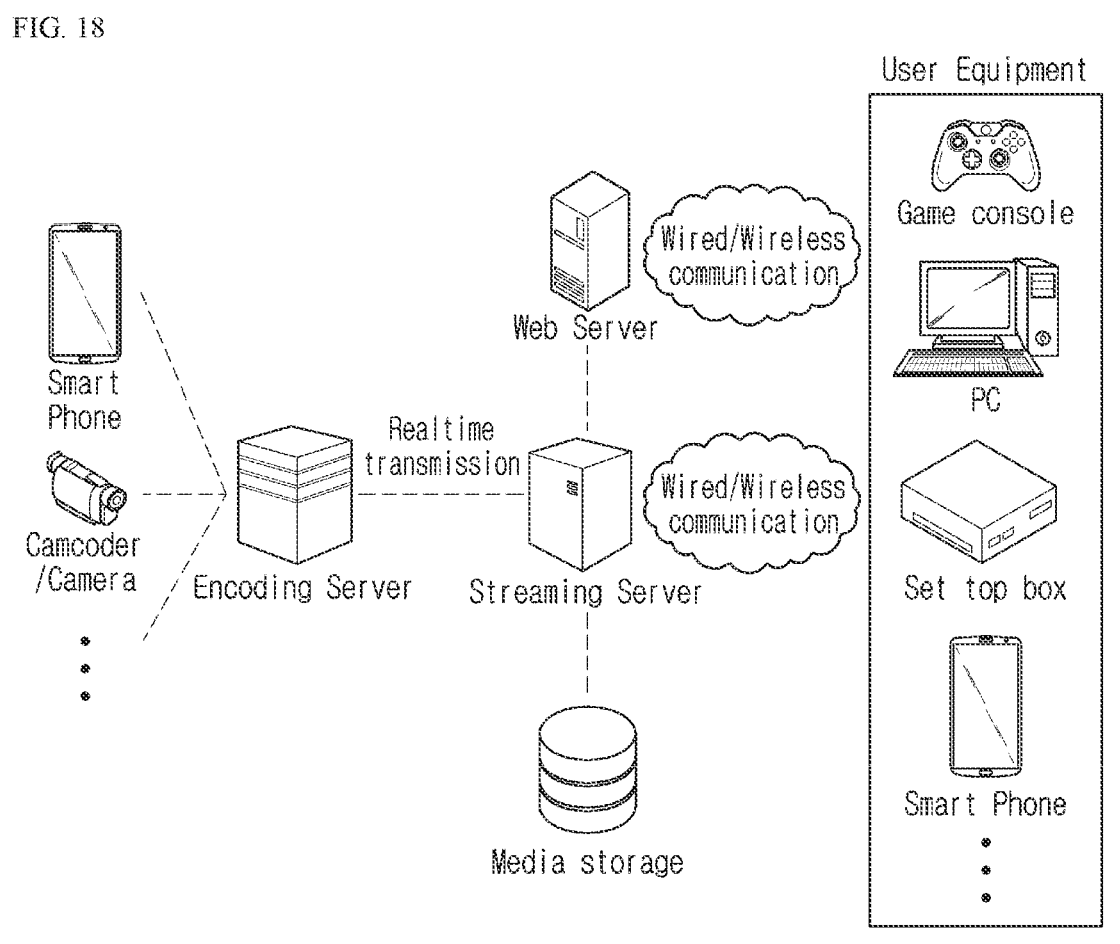

FIG. 18 is a view illustrating a content streaming system, to which an embodiment of the present disclosure is applicable.

MODE FOR INVENTION

Figure 1:
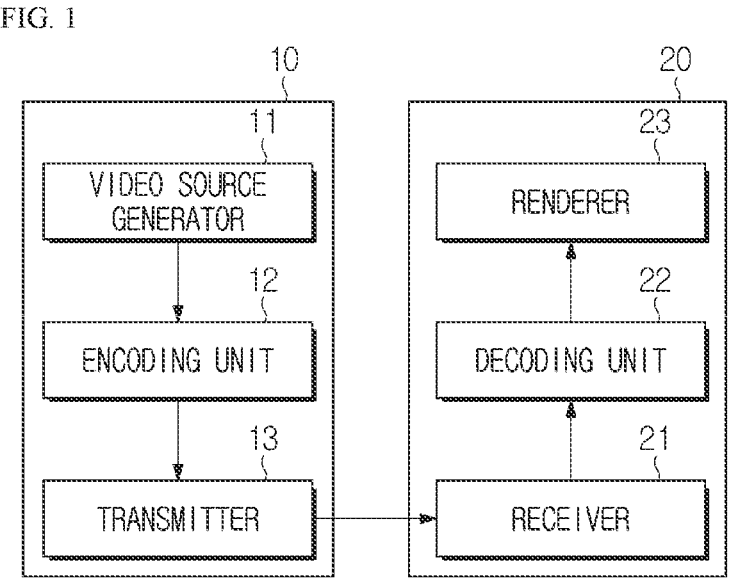
FIG. 1 is a view schematically illustrating a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system to which an embodiment of the present disclosure is applicable.

The video coding system according to an embodiment may include an encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit (encoder) 12 and a transmitter 13. The decoding apparatus 20 according to an embodiment may include a receiver 21, a decoding unit (decoder) 22 and a renderer 23. The encoding unit 12 may be called a video/image encoding apparatus, and the decoding unit 22 may be called a video/image decoding apparatus. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may obtain the encoded video/image information or data output in the form of a bitstream and forward it to the receiver 21 of the decoding apparatus 20 or another external object through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The transmitter 13 may be provided as a transmission device separate from the encoding apparatus 12, and in this case, the transmission device may include at least one processor that acquires encoded video/image information or data output in the form of a bitstream and a transmission unit for transmitting it in the form of a file or streaming. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
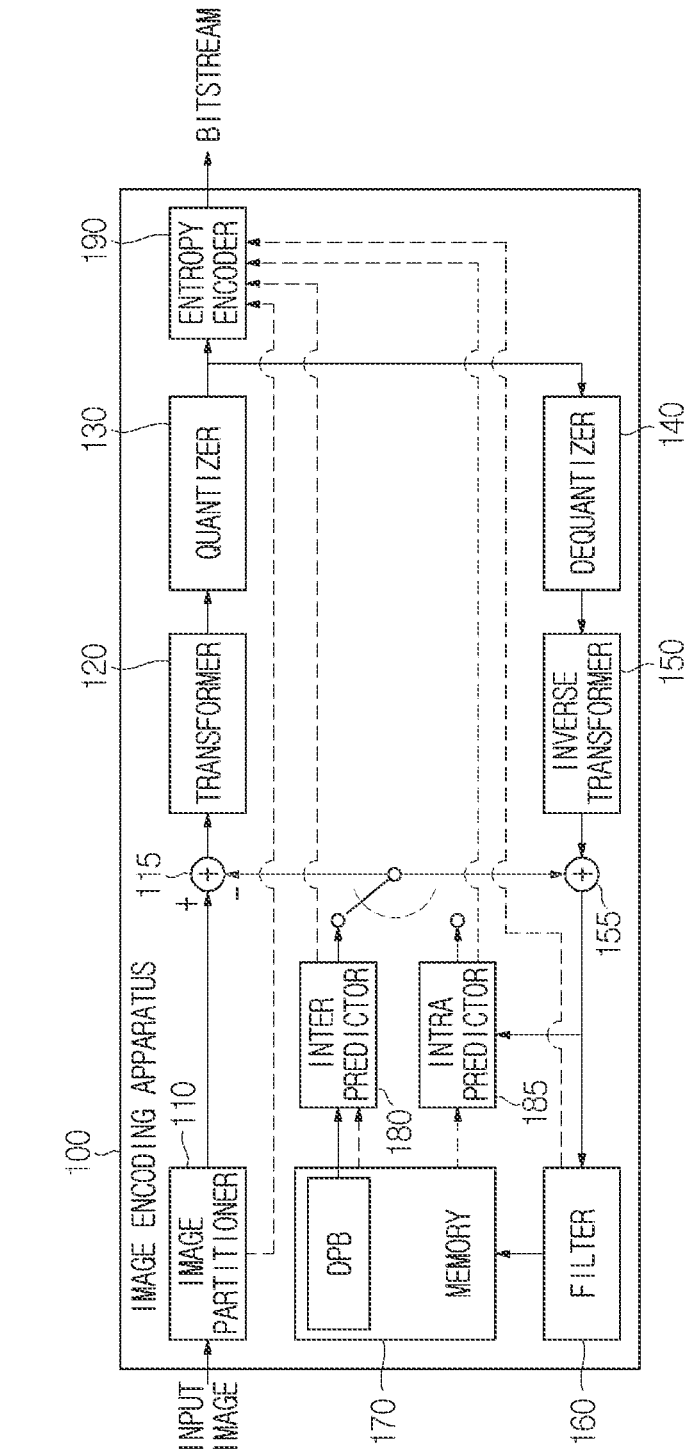
FIG. 2 is a view schematically illustrating an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit(intra predictor) 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit(inter predictor) 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may construct a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
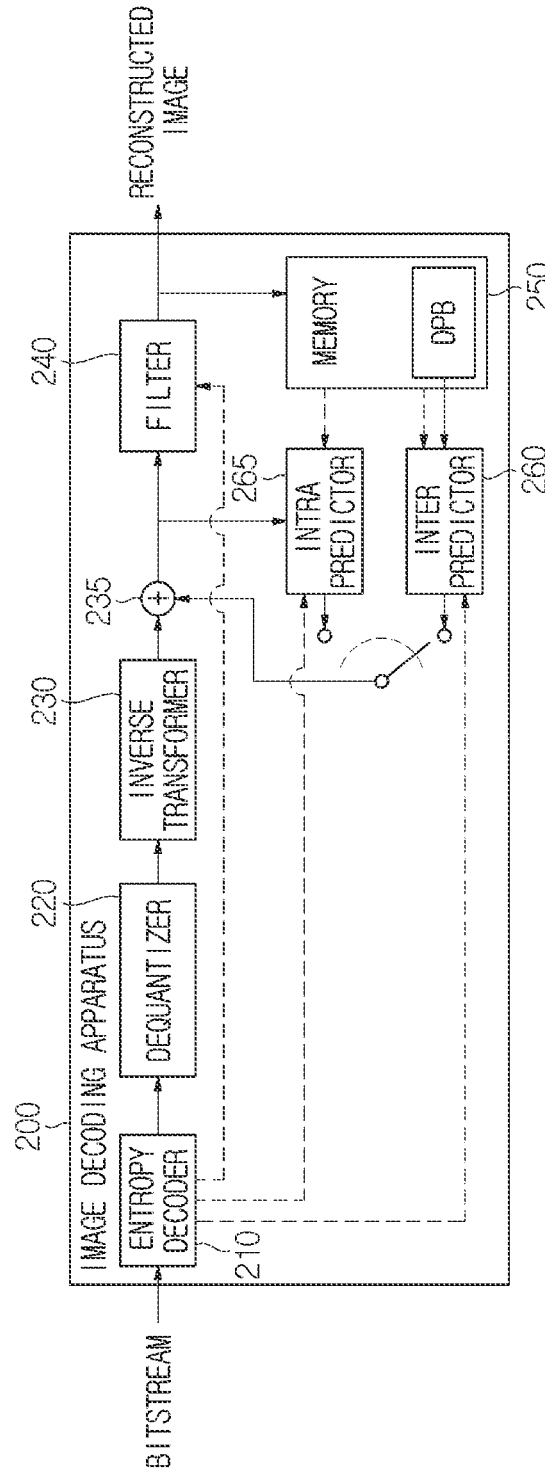
FIG. 3 is a view schematically illustrating an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra prediction unit 265. The inter predictor(inter prediction unit) 260 and the intra predictor(intra prediction unit) 265 may be collectively referred to as a "prediction unit(predictor)". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter predictor 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra predictor 265 may predict the current block by referring to the samples in the current picture. The description of the intra prediction unit 185 is equally applied to the intra prediction unit 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter predictor 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter predictor 260, and the intra predictor 265 of the image decoding apparatus 200.

Inter Prediction

The prediction unit of the image encoding apparatus 100 and the image decoding apparatus 200 may derive a prediction sample by performing inter prediction on a per-block basis. Inter prediction can be a prediction derived in a manner that is dependent on data elements (e.g., sample values or motion information) of picture(s) other than the current picture. When inter prediction is applied to a current block, a predicted block (a prediction sample array) for the current block may be derived on the basis of a reference block (a reference sample array) specified by a motion vector on a reference picture indicated by a reference picture index. Herein, in order to reduce the amount of motion information transmitted in the inter prediction mode, the motion information of the current block may be predicted on a per block, subblock, or sample basis on the basis of the correlation of motion information between a neighboring block and the current block. The motion information may include a motion vector and a reference picture index. The motion information may further include inter prediction type (L0 prediction, L1 prediction. Bi prediction, etc.) information. When inter prediction is applied, neighboring blocks may include a spatial neighboring block present in the current picture and a temporal neighboring block present in the reference picture. The reference picture including the reference block and the reference picture including the temporal neighboring block may be the same or different. The temporal neighboring block may be called a collocated reference block or a collocated CU (colCU). The reference picture including the temporal neighboring block may be called a collocated picture (colPic). For example, a motion information candidate list may be constructed on the basis of neighboring blocks of the current block. A flag or index information indicating which candidate is selected (used) to derive a motion vector and/or a reference picture index of the current block may be signaled. Inter prediction may be performed on the basis of various prediction modes. For example, in the case of a skip mode and a merge mode, motion information of a current block may be the same as motion information of a selected neighboring block. In the case of the skip mode, unlike the merge mode, the residual signal may not be transmitted. In the case of a motion information prediction (motion vector prediction, MVP) mode, a motion vector of a selected neighboring block may be used as a motion vector predictor, and a motion vector difference may be signaled. In this case, a motion vector of the current block may be derived using the sum of the motion vector predictor and the motion vector difference.

The motion information may include L0 motion information and/or L1 motion information according to an inter prediction type (L0 prediction. L1 prediction. Bi prediction, etc.). A motion vector in the L0 direction may be called an L0 motion vector or MVL0, and a motion vector in the L1 direction may be called an L1 motion vector or MVL1. The prediction based on the L0 motion vector may be called L0 prediction. The prediction based on the L1 motion vector may be called L1 prediction. The prediction based on both the L0 motion vector and the L1 motion vector may be called bi-prediction. Herein, the L0 motion vector may refer to a motion vector associated with a reference picture list L0 (L0), and the L1 motion vector may refer to a motion vector associated with a reference picture list L1 (L1). The reference picture list L0 may include, as reference pictures, pictures preceding the current picture in terms of output order. The reference picture list L1 may include pictures following the current picture in terms of output order. The preceding pictures may be called forward (reference) pictures, and the following pictures may be called backward (reference) pictures. The reference picture list L0 may further include, as reference pictures, pictures following the current picture in terms of output order. In this case, within the reference picture list L0, the preceding pictures may be indexed first, and the following pictures may be indexed next. The reference picture list L1 may further include, as reference pictures, pictures preceding the current picture in terms of output order. In this case, within the reference picture list1, the following pictures may be indexed first, and the preceding pictures may be indexed next. Herein, the output order may correspond to the picture order count (POC) order.

FIG. 4 is a diagram schematically showing the inter prediction unit 180 of the image encoding apparatus 100, and FIG. 5 is a flowchart illustrating a method of encoding an image based on inter prediction.

The image encoding apparatus 100 may perform inter prediction on a current block (S510). The image encoding apparatus 100 may derive an inter prediction mode and motion information of the current block, and may generate prediction samples of the current block. Herein, the procedures of determination of the inter prediction mode, derivation of the motion information, and generation of the prediction samples may be performed simultaneously, or any one procedure may be performed before the other procedures. For example, the inter prediction unit 180 of the image encoding apparatus 100 may include a prediction mode determination unit 181, a motion information derivation unit 182, and a prediction sample derivation unit 183. The prediction mode determination unit 181 may determine the prediction mode for the current block. The motion information derivation unit 182 may derive the motion information of the current block. The prediction sample derivation unit 183 may derive the prediction samples of the current block. For example, the inter prediction unit 180 of the image encoding apparatus 100 may search a predetermined area (search area) of reference pictures for a block similar to the current block through motion estimation, and may derive a reference block of which the difference from the current block is a minimum or less than or equal to a predetermined standard. On the basis of this, a reference picture index indicating the reference picture in which the reference block is located may be derived, and a motion vector may be derived on the basis of the location difference between the reference block and the current block. The image encoding apparatus 100 may determine a mode applied to the current block among various prediction modes. The image encoding apparatus 100 may compare RD costs for the various prediction modes and may determine the optimum prediction mode for the current block.

For example, when the skip mode or the merge mode is applied to the current block, the image encoding apparatus 100 may construct a merge candidate list described later, and may derive a reference block of which the difference from the current block is a minimum or less than or equal to a predetermined standard, among reference blocks indicated by merge candidates included in the merge candidate list. In this case, the merge candidate associated with the derived reference block may be selected, and merge index information indicating the selected merge candidate may be generated and signaled to the decoding apparatus. The motion information of the current block may be derived using the motion information of the selected merge candidate.

As another example, when the (A)MVP mode is applied to the current block, the image encoding apparatus 100 may construct an (A)MVP candidate list described later, and may use, as a motion vector predictor (mvp) of the current block, a motion vector of an mvp candidate selected among mvp candidates included in the (A)MVP candidate list. In this case, for example, a motion vector indicating a reference block derived by the above-described motion estimation may be used as a motion vector of the current block. Among the mvp candidates, an mvp candidate having the motion vector having the minimum difference from the motion vector of the current block may be the selected mvp candidate. A motion vector difference (MVD) that is a difference resulting from subtracting the mvp from the motion vector of the current block may be derived. In this case, information on the MVD may be signaled to the image decoding apparatus 200. In addition, when the (A)MVP mode is applied, a value of the reference picture index may be constructed as reference picture index information and may be separately signaled to the image decoding apparatus 200.

The image encoding apparatus 100 may derive residual samples on the basis of the prediction samples (S520). The image encoding apparatus 100 may compare the prediction samples with the original samples of the current block to derive the residual samples.

The image encoding apparatus 100 may encode image information including prediction information and residual information (S530). The image encoding apparatus 100 may output the encoded image information in the form of a bitstream. The prediction information is pieces of information related to the prediction procedure, and may include prediction mode information (e.g., a skip flag, a merge flag, or a mode index) and information on motion information. The information on the motion information may include candidate selection information (e.g., a merge index, an mvp flag, or an mvp index) that is information for deriving a motion vector. In addition, the information on the motion information may include the information on the MVD and/or the reference picture index information described above. In addition, the information on the motion information may include information indicating whether L0 prediction, L1 prediction, or bi-prediction is applied. The residual information is information on the residual samples. The residual information may include information on quantized transform coefficients for the residual samples.

The output bitstream may be stored in a (digital) storage medium and transmitted to the decoding apparatus, or may be transmitted to the image decoding apparatus 200 over a network.

In the meantime, as described above, the image encoding apparatus 100 may generate a reconstructed picture (including reconstructed samples and a reconstructed block) on the basis of the reference samples and the residual samples. This is to derive the same prediction result by the image encoding apparatus 100 as that performed in the image decoding apparatus 200, and through this, coding efficiency may be increased. Accordingly, the image encoding apparatus 100 may store a reconstructed picture (or reconstructed samples, a reconstructed block) in a memory, and may use the same as a reference picture for inter prediction. As described above, an in-loop filtering procedure may be further applied to the reconstructed picture.

Figure 6:
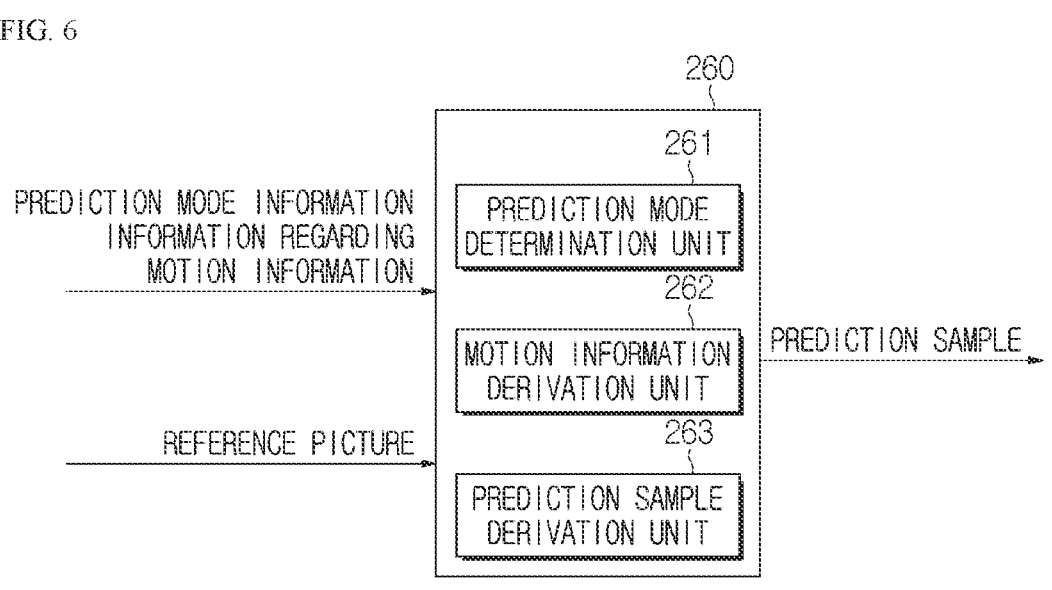
FIG. 6 is a diagram schematically showing an inter prediction unit 260 of an image decoding apparatus 200.
Figure 7:
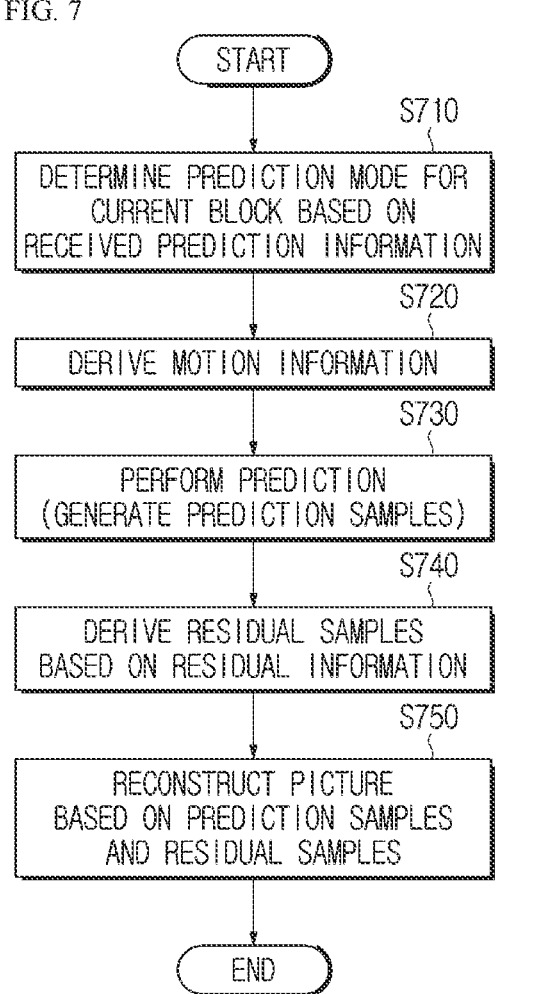
FIG. 7 is a flowchart illustrating a method of decoding an image based on inter prediction.

FIG. 6 is a diagram schematically showing the inter prediction unit 260 of the image decoding apparatus 200, and FIG. 7 is a flowchart illustrating a method of decoding an image based on inter prediction.

The image decoding apparatus 200 may perform the operation corresponding to the operation performed by the image encoding apparatus 100. The image decoding apparatus 200 may perform prediction on the current block on the basis of the received prediction information and may derive prediction samples.

Specifically, the image decoding apparatus 200 may determine a prediction mode for the current block on the basis of the received prediction information (S710). The image decoding apparatus 200 may determine which inter prediction mode is applied to the current block on the basis of the prediction mode information in the prediction information.

For example, on the basis of the merge flag, it may be determined whether the merge mode is applied to the current block or the (A)MVP mode is determined. Alternatively, one of various inter prediction mode candidates may be selected on the basis of the mode index. The inter prediction mode candidates may include a skip mode, a merge mode, and/or an (A)MVP mode, or may include various inter prediction modes described later.

The image decoding apparatus 200 may derive motion information of the current block on the basis of the determined inter prediction mode (S720). For example, when the skip mode or the merge mode is applied to the current block, the image decoding apparatus 200 may construct a merge candidate list described later, and may select one merge candidate among merge candidates included in the merge candidate list. The selection may be performed on the basis of the above-described selection information (a merge index). The motion information of the current block may be derived using the motion information of the selected merge candidate. The motion information of the selected merge candidate may be used as the motion information of the current block.

As another example, when the (A)MVP mode is applied to the current block, the image decoding apparatus 200 may construct an (A)MVP candidate list described later, and may use, as a motion vector predictor (mvp) of the current block, a motion vector of an mvp candidate selected among mvp candidates included in the (A)MVP candidate list. The selection may be performed on the basis of the above-described selection information (an mvp flag or an mvp index). In this case, the MVD of the current block may be derived on the basis of the information on the MVD, and the motion vector of the current block may be derived on the basis of the mvp of the current block and the MVD. In addition, a reference picture index of the current block may be derived on the basis of the reference picture index information. A picture indicated by the reference picture index in the reference picture list related to the current block may be derived as a reference picture that is referenced for inter prediction of the current block.

In the meantime, as will be described later, the motion information of the current block may be derived without constructing a candidate list. In this case, the motion information of the current block may be derived according to a procedure described in a prediction mode described later. In this case, the candidate list configuration as described above may be omitted.

The image decoding apparatus 200 may generate prediction samples for the current block on the basis of the motion information of the current block (S730). In this case, the reference picture may be derived on the basis of the reference picture index of the current block, and the prediction samples of the current block may be derived using samples of a reference block indicated on the reference picture by the motion vector of the current block. In this case, as described later, in some cases, a prediction sample filtering procedure may be further performed on all or some of the prediction samples of the current block.

For example, the inter prediction unit 260 of the image decoding apparatus 200 may include a prediction mode determination unit 261, a motion information derivation unit 262, and a prediction sample derivation unit 263. The prediction mode determination unit 181 may determine the prediction mode for the current block on the basis of received prediction mode information. The motion information derivation unit 182 may derive the motion information (a motion vector and/or a reference picture index) of the current block on the basis of received information on the motion information. The prediction sample derivation unit 183 may derive the prediction samples of the current block.

The image decoding apparatus 200 may generate residual samples for the current block on the basis of the received residual information (S740). The image decoding apparatus 200 may generate reconstructed samples for the current block on the basis of the prediction samples and the residual samples, and may generate, on the basis of this, a reconstructed picture (S750). Afterward, as described above, an in-loop filtering procedure may be further applied to the reconstructed picture.

Figure 8:
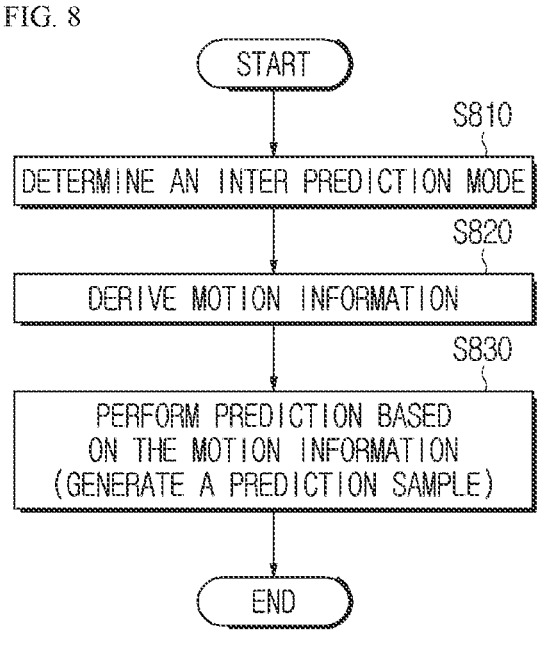
FIG. 8 is a flowchart illustrating an inter prediction method.

Referring to FIG. 8, the inter prediction procedure may include the steps of determining an inter prediction mode (S810), deriving motion information according to the determined prediction mode (S820), and performing prediction based on the derived motion information (generating a prediction sample)(S830). The inter prediction procedure may be performed in the image encoding apparatus 100 and the image decoding apparatus 200 as described above.

Inter Prediction Mode

Various inter prediction modes may be used for prediction of the current block in the picture. For example, various modes, such as a merge mode, a skip mode, a motion vector prediction (MVP) mode, an affine mode, a subblock merge mode, and a merge with MVD (MMVD) mode, and the like may be used. A decoder side motion vector refinement (DMVR) mode, an adaptive motion vector resolution (AMVR) mode, a bi-prediction with CU-level weight (BCW), a bi-directional optical flow (BDOF), and the like may also be used as additional modes additionally or instead. The affine mode may be called an affine motion prediction mode. The MVP mode may be referred to as advanced motion vector prediction (AMVP) mode. In this document, some modes and/or motion information candidates derived by some modes may be included as one of motion information candidates of other modes. For example, an HMVP candidate may be added as a merge candidate in the merge/skip mode or may be added as an mvp candidate in the MVP mode.

Prediction mode information indicating the inter prediction mode of the current block may be signaled from the image encoding apparatus 100 to the image decoding apparatus 200. The prediction mode information may be included in the bitstream and received by the image decoding apparatus 200. The prediction mode information may include index information indicating one of a plurality of candidate modes. Alternatively, the inter prediction mode may be indicated through hierarchical signaling of flag information. In this case, the prediction mode information may include one or more flags. For example, a skip flag may be signaled to indicate whether a skip mode is applied, and if the skip mode is not applied, a merge flag may be signaled to indicate whether a merge mode is applied, and if the merge mode is not applied, it is indicated to apply an MVP mode or a flag for additional classification may be further signaled. The affine mode may be signaled in an independent mode or may be signaled in a mode dependent on the merge mode or the MVP mode. For example, the affine mode may include an affine merge mode and an affine MVP mode.

Meanwhile, information indicating whether list0 (L0) prediction, the list1 (L1) prediction, or the bi-prediction described above is used for the current block (the current coding unit) may be signaled. The information may be called motion prediction direction information, inter prediction direction information, or inter prediction indication information, and may be configured/encoded/signaled, for example, in the form of an inter_pred_idc syntax element. That is, the inter_pred_idc syntax element may indicate whether list0 (L0) prediction, the list1 (L1) prediction, or the bi-prediction described above is used for the current block (the current coding unit). In the present disclosure, for the convenience of explanation, the inter prediction type (L0 prediction, L1 prediction, or BI prediction) indicated by the inter_pred_idc syntax element may be indicated as a motion prediction direction. L0 prediction may be represented as pred_L0, L1 prediction as pred_L1, and pair prediction as pred_BI. For example, depending on the value of the inter_pred_idc syntax element, the prediction types shown in Table 1 below may be represented.

TABLE 1

| inter_pred_idc | Name of inter_pred_idc | |
|---|---|---|
| | (cbWidth+cbHeight )!=8 | (cbWidth+cbHeight )==8 |
| 0 | PRED_L0 | PRED_L0 |
| 1 | PRED_L1 | PRED_L1 |
| 2 | PRED_BI | n.a. |

As described above, a picture may include one or more slices. A slice may have one of slice types including an intra (I) slice, a predictive (P) slice, and a bi-predictive (B) slice. The slice type may be indicated based on slice type information. For blocks in an I slice, inter prediction is not used for prediction, and only intra prediction may be used. Of course, even in this case, original sample values may be coded and signaled without prediction. For blocks in a P slice, intra prediction or inter prediction may be used, and when inter prediction is used, only uni prediction may be used. On the other hand, for blocks in a B slice, intra prediction or inter prediction may be used, and when inter prediction is used, up to bi-prediction may be used.

L0 and L1 may include reference pictures encoded/decoded before the current picture. For example, L0 may include reference pictures before and/or after the current picture in POC order, and L1 may include reference pictures after and/or before the current picture in POC order. In this case, in L0, relatively lower reference picture indices may be assigned to reference pictures before the current picture in POC order, and in L1, relatively lower reference picture indices may be assigned to reference pictures after the current picture in POC order. For B slices, bi-prediction may be applied, and in this case, uni-directional bi-prediction may be applied, or bi-directional bi-prediction may be applied. Bi-directional bi-prediction may be called true bi-prediction.

Specifically, for example, information about the inter prediction mode of the current block may be coded and signaled at the level of the CU (CU syntax) or implicitly determined according to conditions. In this case, some modes may be explicitly signaled and the remaining some modes may be implicitly derived.

MVP Mode

An MVP (Motion Vector Prediction) mode may be referred to as an AMVP (advanced motion vector prediction) mode. When the MVP mode is applied, a motion vector predictor (mvp) candidate list may be generated using a motion vector of a reconstructed spatial neighboring block and/or a motion vector corresponding to a temporal neighboring block (or, Col block). That is, the motion vector of the reconstructed spatial neighboring block and/or the motion vector corresponding to the temporal neighboring block may be used as motion vector predictor candidates. When bi-prediction is applied, an mvp candidate list for deriving L0 motion information and an mvp candidate list for deriving L1 motion information may be generated and used separately. The above-described prediction information (or information about prediction) may include selection information (e.g., an MVP flag or an MVP index) indicating an optimal motion vector predictor candidate selected from among the motion vector predictor candidates included in the list. At this time, the prediction unit may select the motion vector predictor of the current block from among the motion vector predictor candidates included in the motion vector candidate list by using the selection information. The prediction unit of the encoding apparatus may obtain a motion vector difference (MVD) between the motion vector of the current block and the motion vector predictor, and may encode it and output it in the form of a bitstream. Tat is, the MVD may be obtained as a value obtained by subtracting the motion vector predictor from the motion vector of the current block. At this time, the prediction unit of the decoding apparatus may obtain the motion vector difference included in the information about prediction, and derive the motion vector of the current block by adding the motion vector difference and the motion vector predictor. The prediction unit of the decoding apparatus may obtain or derive a reference picture index indicating a reference picture, etc., from the information about prediction.

Figure 9:
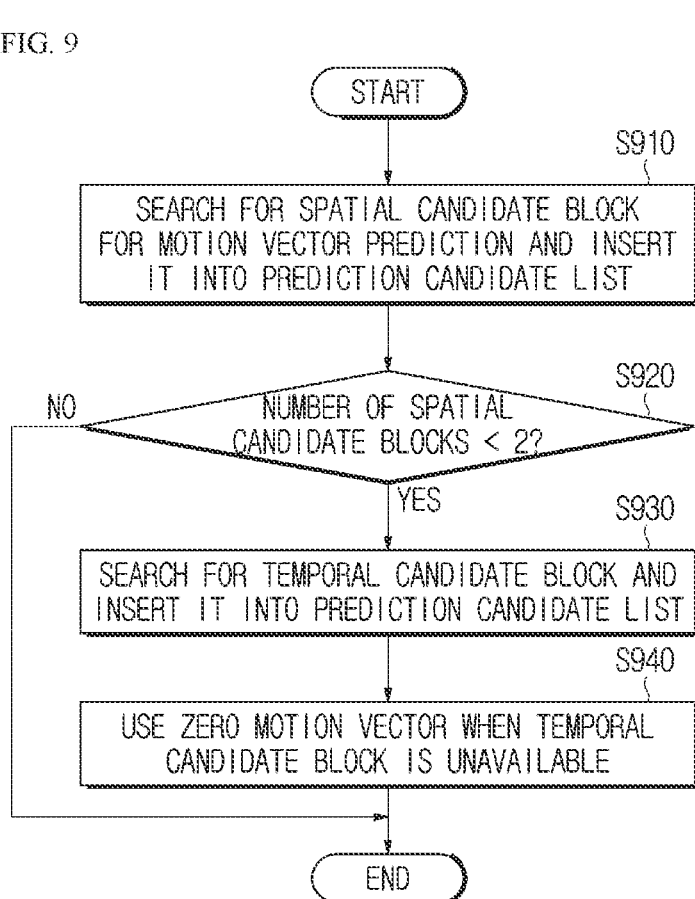
FIG. 9 is a flowchart illustrating a method of constructing a motion vector predictor candidate list.

An example of a method of constructing a motion vector predictor candidate list is as illustrated in FIG. 9. Each step of FIG. 9 may be performed by the image encoding apparatus 100 or the image decoding apparatus 200. Hereinafter, for convenience of explanation, each step of FIG. 9 will be described based on the image decoding apparatus 200.

Referring to FIG. 9, the image decoding apparatus 200 may search for a spatial merge candidate block for motion vector prediction and insert it into a prediction candidate list (S910). In addition, the image decoding apparatus 200 may determine whether the number of spatial candidate blocks in the prediction candidate list is less than 2 (S920).

If the number of spatial candidate blocks in the prediction candidate list is less than 2 ('YES' of S920), the image decoding apparatus 200 may search for a temporal candidate block and insert it into the prediction candidate list (S930). If the temporal candidate block is unavailable, the image decoding apparatus 200 may construct the prediction candidate list using a zero motion vector (S940).

In contrast, if the number of spatial candidate blocks in the prediction candidate list is 2 or more ('NO' of S920), the image decoding apparatus 200 may skip the above-described steps S930 and S940 and end the construction of the prediction candidate list.

Meanwhile, when the MVP mode is applied, a reference picture index may be explicitly signaled. In this case, the reference picture index for L0 prediction (refidxL0) and the reference picture index for L1 prediction (refidxL1) may be signaled separately. For example, when the MVP mode is applied and BI prediction is applied, both information about refidxL0 and information about refidxL1 may be signaled.

MVD Coding

When the MVP mode is applied, information about the MVD derived in the encoding apparatus as described above may be signaled to the decoding apparatus. The information about the MVD may include, for example, information indicating x, y components for the MVD absolute value and sign. In this case, information indicating whether the MVD absolute value is greater than 0 and greater than 1, and the MVD remainder may be signaled in stages. For example, information indicating whether the MVD absolute value is greater than 1 may be signaled only when the value of the flag information indicating whether the MVD absolute value is greater than 0 is 1.

Information about the MVD may be encoded in the encoding apparatus and signaled to the decoding apparatus using syntax shown in Table 2 below, for example.

TABLE 2

|  | Descriptor |
|---|---|
| mvd_coding( x0, y0, refList, cpIdx ) { |  |
| abs_mvd_greater0_flag[ 0 ] | ae(v) |
| abs_mvd_greater0_flag[ 1 ] | ae(v) |
| if( abs_mvd_greater0_flag[ 0 ] ) |  |
| abs_mvd_greater1_flag[ 0 ] | ae(v) |
| if( abs_mvd_greater0_flag[ 1 ] ) |  |
| abs_mvd_greater1_flag[ 1 ] | ae(v) |
| if( abs_mvd_greater0_flag[ 0 ] ) { |  |
| if( abs_mvd_greater1_flag[ 0 ] ) |  |
| abs_mvd_minus2[ 0 ] | ae(v) |
| mvd_sign_flag[ 0 ] | ae(v) |
| } |  |
| if( abs_mvd_greater0_flag[ 1 ] ) { |  |
| if( abs_mvd_greater1_flag[ 1 ] ) |  |
| abs_mvd_minus2[ 1 ] | ae(v) |
| mvd_sign_flag[ 1 ] | ae(v) |
| } |  |
| } |  |

Referring to Table 2, MVD[compIdx] may be derived based on abs_mvd_greater0_flag[compIdx]*(abs_mvd_minus2[compIdx]+2)*(1−2*mvd_sign_flag[compIdx]). Here, compIdx (or cpIdx) represents the index of each component and may have a value of 0 or 1, compIdx 0 may indicate the x component, and compIdx 1 may indicate the y component. However, this is only an example, and the value of each component may be represented using a coordinate system other than the x, y coordinate system.

Meanwhile, MVD (MVDL0) for L0 prediction and MVD (MVDL1) for L1 prediction may be signaled separately, and information about the MVD may include information about MVDL0 and/or information about MVDL1. For example, when the MVP mode is applied to the current block and BI prediction is applied, both the information about MVDL0 and the information about MVDL1 may be signaled.

Symmetric MVD

Figure 10:
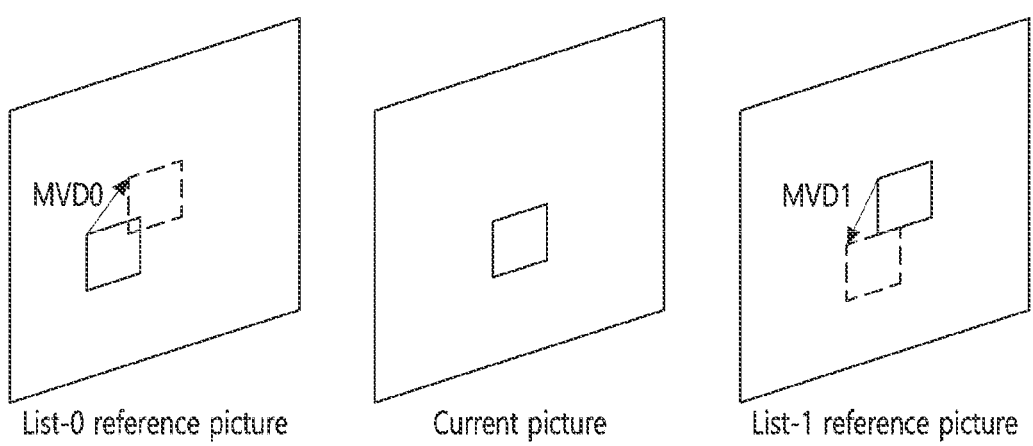
FIG. 10 is a diagram illustrating a symmetric MVD mode.

Meanwhile, when BI prediction is applied, symmetric MVD, such as the example of FIG. 10, may be used by considering coding efficiency. In this case, signaling of some of the motion information may be omitted. For example, when symmetric MVD is applied to the current block, information about refidxL0, information about refidxL1, and information about MVDL1 may not be signaled from the encoding apparatus to the decoding apparatus, but may be derived internally. For example, when MVP mode and BI prediction are applied to the current block, flag information indicating whether symmetric MVD is applied (e.g., symmetric MVD flag information or sym_mvd_flag syntax element) may be signaled, and when the value of the flag information is 1, the decoding apparatus may determine that symmetric MVD is applied to the current block.

When the symmetric MVD mode is applied (i.e., when the value of the symmetric MVD flag information is 1), information about mvp_l0_flag, mvp_l1_flag, and MVDL0 may be explicitly signaled, and signaling of information about refidxL0, information about refidxL1, and information about MVDL1 may be omitted and derived internally as described above. For example, refidxL0 may be derived as an index indicating a previous reference picture that is closest to the current picture in POC order within reference picture list 0 (which may be referred to as list 0 or L0). refidxL1 may be derived as an index indicating a subsequent reference picture that is closest to the current picture in POC order within reference picture list 1 (which may be referred to as list 1 or L1). Alternatively, for example, both refidxL0 and refidxL1 may be derived to be 0, respectively. Alternatively, for example, refidxL0 and refidxL1 may be derived to be minimum indices having the same POC difference in relation to the current picture, respectively. Specifically, for example, when [POC of the current picture]−[POC of the first reference picture indicated by refidxL0] is referred to as a first POC difference, and [POC of the second reference picture indicated by refidxL1] is referred to as a second POC difference, the value of refidxL0 indicating the first reference picture may be derived to be the value of refidxL0 of the current block only when the first POC difference and the second POC difference are the same, and the value of refidxL1 indicating the second reference picture may be derived to be the value of refidxL1 of the current block. In addition, for example, if there are multiple sets in which the first POC difference and the second POC difference are the same, refidxL0 and refidxL1 of the set with a minimum difference may be derived to be refidxL0 and refidxL1 of the current block.

MVDL1 may be derived to be −MVDL0. For example, the final MV for the current block may be derived as shown in Equation 1 below.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases} \quad \text{[Equation 1]}$$

Template Matching (TM)

Template Matching (TM) is a motion vector derivation method performed at a decoder stage, and is a method of refining motion information of a current block by finding a template (hereinafter referred to as "reference template") in a reference picture which is most similar to a template (hereinafter referred to as "current template") adjacent to the current block (e.g., current coding unit, current CU). The current template may be a top neighboring block and/or a left neighboring block of the current block, or may be some of these neighboring blocks. Additionally, the reference template may be determined to have the same size as the current template.

Figure 11:
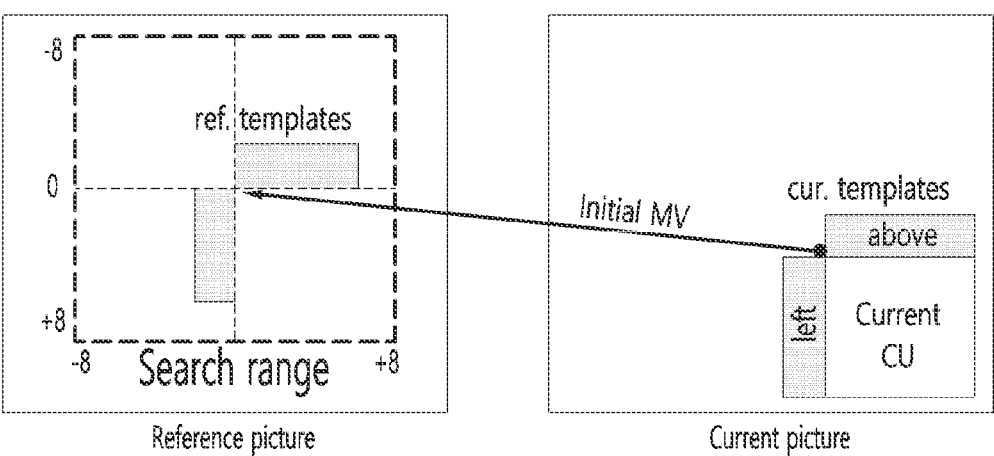
FIG. 11 is a diagram illustrating a template matching-based encoding/decoding method according to the present disclosure.

FIG. 11 is a diagram for explaining a template matching-based encoding/decoding method according to the present disclosure.

As shown in FIG. 11, when an initial motion vector of the current block is derived, a search for a better motion vector may be performed in the surrounding area of the initial motion vector. For example, the range of the surrounding area where the search is performed may be within the [−8, +8]-pel search area centered on the initial motion vector. Additionally, the size of the search step for performing the search may be determined based on the AMVR mode of the current block. Additionally, template matching may be performed continuously with a bilateral matching process in the merge mode.

If the prediction mode of the current block is the AMVP mode, a motion vector predictor candidate (MVP candidate) may be determined based on a template matching cost. For example, a motion vector predictor candidate (MVP candidate) that minimizes an error between the current template and the reference template may be selected. After that, template matching for refining a motion vector may be performed on the selected motion vector predictor candidate. At this time, template matching for refining a motion vector may not be performed on motion vector predictor candidates that are not selected.

In the present disclosure, template matching may be a process of searching for a reference template with the highest similarity to a current template. According to the present disclosure, a template matching cost may be calculated to measure the similarity, and a cost function such as SAD may be used for this purpose. A high template matching cost may mean that the template matching error is large and therefore the similarity between templates is low. Conversely, a small template matching cost may mean that the template matching error is small and therefore the similarity between templates is high.

In the present disclosure, the cost function for calculating the template matching cost may be a function that uses a difference between a sample value in the current template and a corresponding sample value in the reference template. Therefore, the cost function may be referred to as a "difference(error)-based function" or "difference(error)-based equation" between corresponding samples in two templates. In addition, the template matching cost calculated by the cost function may be referred to as a "difference (error)-based function value" or "difference (error)-based value" between corresponding samples in two templates.

Reference Picture Resampling (RPR)

Depending on the video compression technology, adaptive resolution change (ARC) of Coded Layer Video Sequence (CLVS) may be supported. If ARC is allowed, a reference picture having a different resolution from a current picture may be resampled. The reference picture may be a picture included in the same layer as a current layer including the current picture. Resampling may be referred to as Reference Picture Resampling (RPR). For example, reference picture resampling may include a process of scaling and interpolating the reference picture.

When ARC is allowed, inter prediction may be performed based on reference pictures with different resolutions. The reference pictures may have different widths and/or heights of luma samples from the current picture. For inter prediction, the reference pictures may be resampled. The prediction samples of the current block in the current picture may be derived based on the motion vector of the current block and the resampled reference pictures.

MVD Sign Prediction

If the prediction mode of the current block is AMVP mode, possible MVD sign combinations may be sorted based on the template matching cost, and an index corresponding to the actual MVD sign may be derived and coded by the context model. In the decoding stage, the MVD sign may be derived as follows.

1) The magnitudes of MVD components are parsed.
2) The context-coded MVD sign prediction index is parsed.
3) Motion vector candidates are generated by generating combinations between available signs and MVD absolute values and are added to the motion vector predictor.
4) The MVD sign prediction cost for each motion vector derived based on template matching cost and sorting is derived.
5) The actual MVD sign is selected using the MVD sign prediction index.

According to the above-described prediction process, the MVD sign is not directly signaled, but only the sign combination index information indicating the sign combination actually selected from among the possible sign combinations sorted based on the template matching cost is signaled. However, if the reference picture is resampled, the reference picture must be scaled and interpolated to correspond to the size of the current picture in order to calculate the template matching cost, and this process must be performed for all possible sign combinations. As a result, the problem of increased throughput and decreased accuracy compared to the case of referencing a reference picture that has not been resampled occurs.

In order to solve such a problem, the present disclosure proposes an adaptive MVD sign determination method based on whether a reference picture is resampled. The various embodiments of the present disclosure described below are merely intended to explain representative aspects of the present disclosure, and may be applied individually or in combination of two or more. Hereinafter, various embodiments of the present disclosure will be described with reference to the attached drawings.

Embodiment 1

According to Embodiment 1 of the present disclosure, in the decoding stage, an MVD sign may be determined differently based on whether the reference picture is resampled. Specifically, if the reference picture of the current block is resampled, an MVD sign prediction process is skipped (or bypassed), and the MVD sign may be directly obtained through a bitstream. In contrast, if the reference picture of the current block is not resampled, the MVD sign may be derived from the MVD sign list through the MVD sign prediction process.

Figure 12:
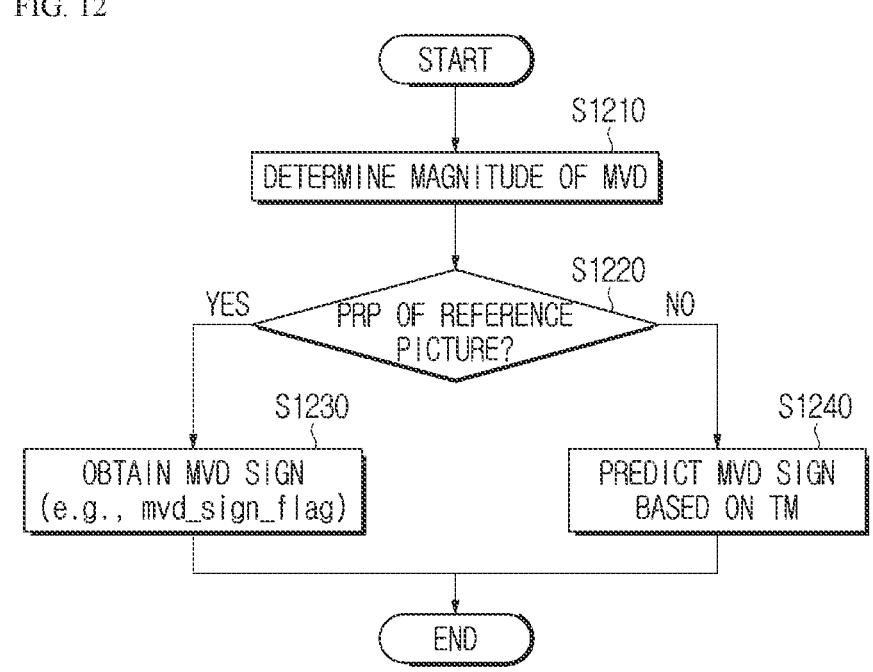
FIGS. 12 and 13 are flowcharts illustrating an MVD determination method according to an embodiment of the present disclosure.

FIG. 12 is a flowchart illustrating a method of determining an MVD according to an embodiment of the present disclosure. Each step of FIG. 12 may be performed by the image decoding apparatus 200.

Referring to FIG. 12, the image decoding apparatus 200 may determine a magnitude of an MVD to derive an MVD of a current block in an inter prediction mode, for example, an AMVP mode (S1210). In one example, the magnitude of the MVD may be determined based on information about the MVD magnitude obtained from the mvd_coding syntax described below (e.g., abs_mvd_greater0_flag, etc.).

The image decoding apparatus 200 may determine whether a reference picture is resampled to determine a sign of the MVD (S1220).

The method of determining the MVD sign may vary depending on whether the reference picture is resampled. Specifically, if the reference picture of the current block is resampled ('YES' of S1220), the image decoding apparatus 200 may obtain an MVD sign flag (e.g., mvd_sign_flag) from the mvd_coding syntax described below, and determine the MVD sign based on the obtained MVD sign flag (S1230). In this case, the MVD sign prediction process based on template matching described above is skipped. In contrast, if the reference picture of the current block is not resampled ('NO' of S1220), the image decoding apparatus 200 may perform MVD sign prediction based on template matching to derive the MVD sign (S1240). As described above, MVD sign prediction based on template matching may be performed by performing template matching to sort an MVD sign list (or an MVD sign candidate list), and selecting one MVD sign candidate from the sorted MVD sign list based on an MVD sign index (or an MVD sign prediction index) (e.g., mvd_sign_pair_idx).

The above-described MVD determination method may be performed individually for each reference picture list or prediction direction using the mvd_coding syntax. For example, in the case of bidirectional prediction, the MVD may be determined individually for each of the L0 direction and the L1 direction. As a result, whether the reference picture is resampled and whether MVD sign prediction is performed based thereon may also be determined differently depending on the reference picture list or the prediction direction.

An example of the mvd_coding syntax structure applicable to Embodiment 1 of the present disclosure is shown in Table 3 and Table 4 below.

TABLE 3

| | Descriptor |
|---|---|
| mvd_coding( x0, y0, refList, cpIdx ) { | |
| abs_mvd_greater0_flag[ 0 ] | ae(v) |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| if(isRPR(refList, ref_idx_lx)) | |

TABLE 3-continued

| | Descriptor |
|---|---|
| mvd_sign_flag[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| if(isRPR(refList, ref_idx_lx)) | |
| mvd_sign_flag[ 1 ] | ae(v) |
| } | |
| } | |

Referring to Table 3, the mvd_coding syntax may include abs_mvd_greater0_flag, abs_mvd_greater1_flag, and abs_mvd_minus2 as information about the MVD magnitude. In Table 3, [0] and [1] represent respective components of the MVD, for example, in the x, y coordinate system, [0] may represent the x component of the MVD, and [1] may represent the y component of the MVD. The syntax element abs_mvd_greater0_flag may indicate whether the absolute value of each component of the MVD is greater than 0. In addition, the syntax element abs_mvd_greater1_flag may indicate whether the absolute value of each component of the MVD is greater than 1. If the absolute value of each component of MVD is greater than 1, the syntax element abs_mvd_minus2 may be further signaled. The value obtained by adding 2 to the syntax element abs_mvd_minus2 may represent the absolute value of each component of MVD.

In addition, the mvd_coding syntax may include mvd_sign_flag as information about the MVD sign. The syntax element mvd_sign_flag may (directly) indicate the sign of each component of the MVD. For example, if mvd_sign_flag[0] is 0, the x component of the MVD may have a positive value. In contrast, if mvd_sign_flag[0] is 1, the x component of the MVD may have a negative value.

The syntax element mvd_sign_flag may be signaled only when the reference picture is resampled, unlike the mvd_coding syntax described above with reference to Table 2. That is, if the reference picture is resampled (i.e., isRPR (refList, ref_idx_lx)=true), mvd_sign_flag is signaled, and the MVD sign may be directly obtained at the decoding stage through mvd_sign_flag. In contrast, if the reference picture is not resampled (i.e., isRPR(refList, ref_idx_lx) =false), mvd_sign_flag is not signaled, and the MVD sign may be derived at the decoding stage through the MVD sign prediction process described above.

TABLE 4

| | Descriptor |
|---|---|
| mvd_coding( x0, y0, refList, cpIdx ) { | |
| ... | |
| if(isRPR(refList, ref_idx_lx) == false) | |
| mvd_sign_pair_idx | ae(v) |
| ... | |
| } | |

Table 4 shows an example of an myd_coding syntax structure including an MVD sign index. Referring to Table 4, the syntax element mvd_sign_pair_idx, which indicates the MVD sign of the current block among the MVD sign candidates, may be signaled only when the reference picture of the current block is not resampled (i.e., isRPR(refList, ref_idx_lx)==false).

The syntax element mvd_sign_pair_idx may be encoded/ signaled based on fixed length coding (FLC), variable length coding (VLC), or arithmetic coding. Specifically, context adaptive binary arithmetic coding (CABAC) based on arithmetic coding, Exp-Golomb coding based on variable length coding, and fixed length coding (FLC) may be applied.

Figure 13:
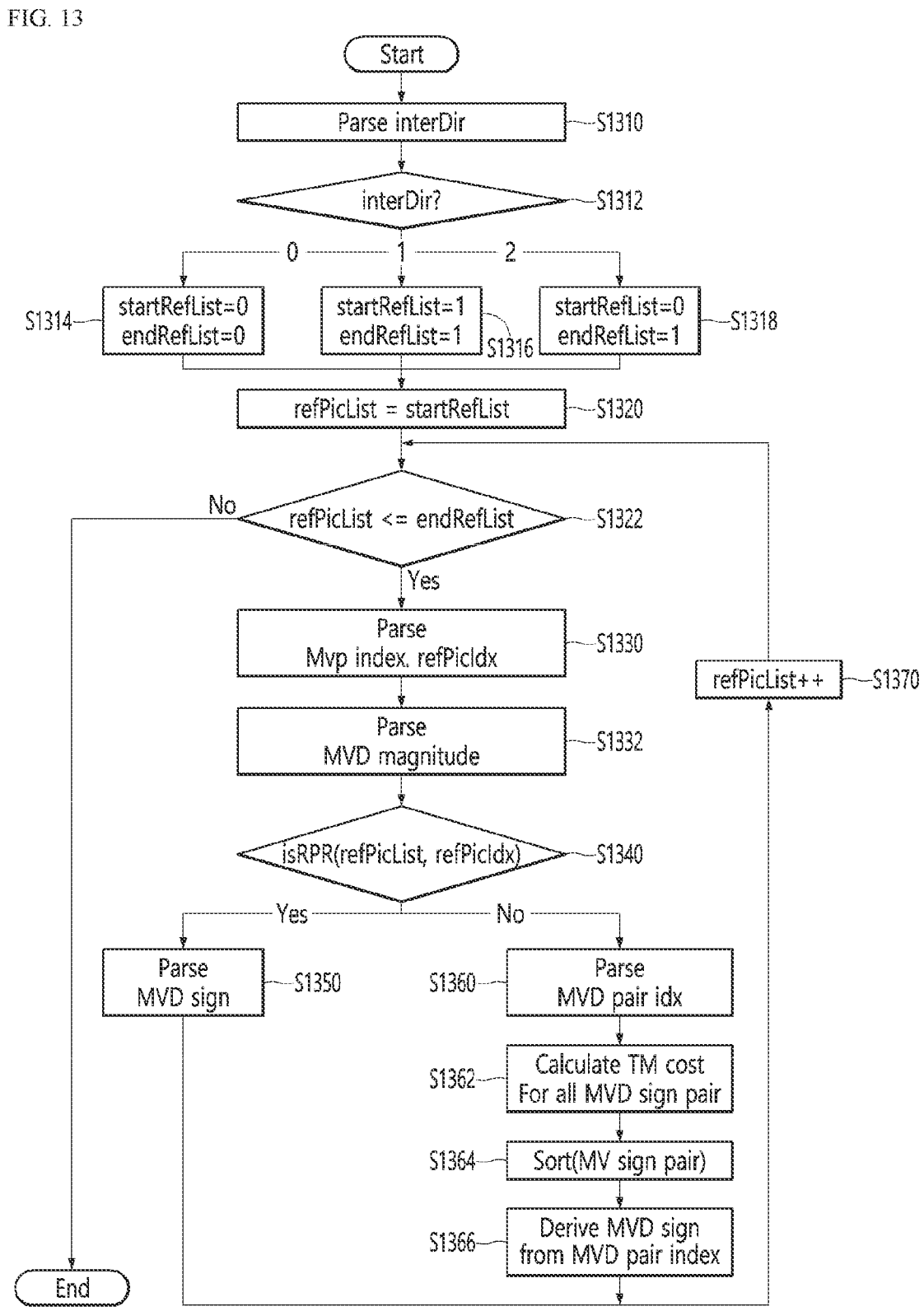

A specific example of a method of determining an MVD based on the syntax structures of Tables 3 and 4 is illustrated in FIG. 13. Each step of FIG. 13 may be performed by the image decoding apparatus 200.

Referring to FIG. 13, the image decoding apparatus 200 may obtain inter prediction direction information of a current block from a bitstream (S1310) and determine an inter prediction direction of the current block based on the obtained information (S1312). Here, the inter prediction direction information refers to information indicating the prediction direction of the current block (e.g., L0 prediction, L1 prediction, or BI prediction), and may be the syntax element inter_pred_idc described above with reference to Table 1.

If the obtained information indicates L0 prediction ('0' of S1312), the image decoding apparatus 200 may set predetermined control variables startRefList and endRefList to 0, respectively (S1314). Alternatively, if the obtained information indicates L1 prediction ('1' of S1312), the image decoding apparatus 200 may set the control variables startRefList and endRefList to 1, respectively (S1316). Alternatively, if the obtained inter prediction direction information indicates BI prediction ('2' of S1312), the image decoding apparatus 200 may set the control variable startRefList to 0 and the control variable endRefList to 1 (S1318).

The image decoding apparatus 200 initializes a variable refPicList representing a reference picture list of the current block to a value equal to the control variable startRefList (S1320), and determines whether the variable refPicList is less than or equal to the control variable endRefList (S1322) to determine whether to perform MVD sign prediction. Here, the variable refPicList being greater than the control variable endRefList may mean that the MVD sign has been determined for all reference picture lists or prediction directions of the current block.

As a result of the determination in step S1322, if the variable refPicList is less than or equal to the control variable endRefList ('YES' of S1322), the image decoding apparatus 200 may obtain an MVP index indicating one candidate among the candidates included in a predetermined MVP candidate list and a reference picture index (e.g., refPicIdx) from the bitstream (S1330), and obtain information about the MVD magnitude described above (e.g., abs_mvd_greater0_flag, etc.) from the bitstream with reference to Table 3 (S1332). Then, the image decoding apparatus 200 may determine whether the reference picture of the current block specified by the reference picture list and the reference picture index has been resampled (S1340).

As a result of the determination in step S1340, if the corresponding reference picture is resampled (e.g., isRPR (refPicList, refPicIdx)=true) ('YES' of S1340), the image decoding apparatus 200 may skip the MVD sign prediction process and obtain the MVD sign (e.g., mvd_sign flag) directly from the bitstream (S1350).

In contrast, if the reference picture is not resampled (e.g., isRPR(refPicList, refPicIdx)=false) ('NO' of S1340), the image decoding apparatus 200 may obtain an MVD sign index (e.g., mvd_sign_pair_idx) indicating the MVD sign of the current block from among the MVD sign candidates from the bitstream (S1360). The MVD sign candidate may be expressed as a combination of component signs of the MVD, and may be, for example, any one of '(0, 0), (0, 1), (1, 0), or (1, 1) (where, 0: positive sign, 1: negative sign)' according to the x, y coordinate system.

Next, the image decoding apparatus 200 may perform template matching to sort the MVD sign list. Specifically, the image decoding apparatus 200 may calculate a template matching cost for all MVD sign candidates in the MVD sign list (S1362) and sort the MVD sign candidates based on the calculated template matching cost (S1364). In one example, the sorting may be performed in ascending order of the template matching cost. That is, a smaller index value may be assigned to a lower template matching cost in the MVD sign list. Meanwhile, for MVD sign candidates having the same template matching cost, the original order may be applied without change, or a predefined order (e.g., (0, 0)→(0, 1)→(1, 0)→(1, 1)) may be applied.

The image decoding apparatus 200 may derive the MVD sign of the current block by selecting an MVD sign candidate from the sorted MVD sign list based on the obtained MVD sign index (e.g., mvd_sign_pair_idx) (S1366).

Meanwhile, although FIG. 13 shows that the MVD sign list is sorted based on the template matching cost (S1362 and S1364) after obtaining the MVD sign index (e.g., mvd_sign_jair_idx) (S1360), the order is only an example and the embodiments of the present disclosure are not limited thereto. For example, unlike as illustrated in FIG. 13, it is of course possible to obtain the MVD sign index after sorting the MVD sign list based on the template matching cost.

When the process (S1330 to S1366) is completed, the image decoding apparatus 200 may return to step S1322 and repeat the above-described process for the remaining reference picture list, after increasing the variable refPicList by 1 (S1370).

Meanwhile, as a result of the determination in step S1322, if the above-described variable refPicList is greater than the control variable endRefList ('NO' of S1322), the image decoding apparatus 200 may determine that the MVD sign has been determined for all reference picture lists or prediction directions of the current block and terminate all the above-described processes.

As described above, according to Embodiment 1 of the present disclosure, the MVD sign prediction process may be performed only when the reference picture of the current block is not resampled. Accordingly, the problem of increased throughput and decreased accuracy caused by performing template matching-based MVD sign prediction for the RPR reference picture can be solved. Such advantageous effect can be more prominent in certain applications, for example, low latency applications.

Embodiment 2

According to Embodiment 2 of the present disclosure, when performing inter prediction of a current block, whether or not to sort the MVD sign list may be determined based on whether the reference picture is resampled. More specifically, the above-described MVD sign prediction process is performed regardless of whether the reference picture is resampled, but the sorting of the MVD sign list based on template matching may be performed only when the corresponding reference picture is not resampled. That is, when the reference picture of the current block is resampled, the process of sorting the MVD sign list based on template matching may be skipped, and in this case, the MVD sign may be derived from a predefined MVD sign list.

Figure 14:
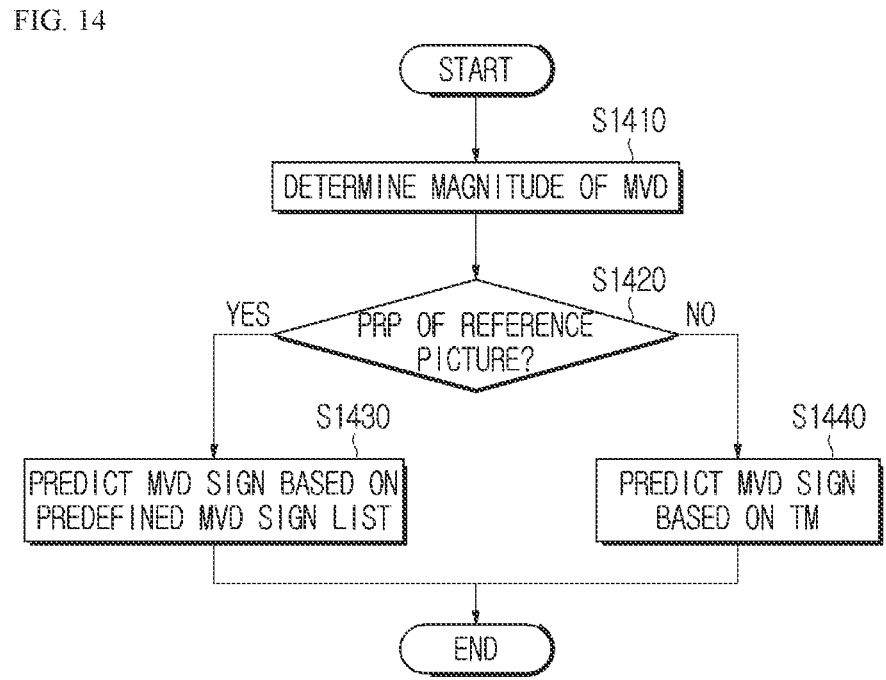
FIGS. 14 and 15 are flowcharts illustrating an MVD determination method according to an embodiment of the present disclosure.

FIG. 14 is a flowchart illustrating a method of determining an MVD according to an embodiment of the present disclosure. Each step of FIG. 14 may be performed by the image decoding apparatus 200.

Referring to FIG. 14, the image decoding apparatus 200 may determine a magnitude of MVD to derive the MVD of a current block in an inter prediction mode, for example, an AMVP mode (S1410). In one example, the magnitude of the MVD may be determined based on information about the MVD magnitude obtained from the mvd_coding syntax described below (e.g., abs_mvd_greater0_flag, etc.).

The image decoding apparatus 200 may determine whether to resample a reference picture to determine an MVD sign prediction method (S1420).

Whether template matching is performed may vary depending on whether the reference picture is resampled. Specifically, if the reference picture of the current block is resampled ('YES' of S1420), the image decoding apparatus 200 may derive an MVD sign from a predefined MVD sign list (S1430). In this case, the MVD sign list sorting process based on the template matching is skipped.

In contrast, if the reference picture of the current block is not resampled ('NO' of S1420), the image decoding apparatus 200 may perform MVD sign prediction based on template matching to derive the MVD sign (S1440). The MVD sign prediction based on template matching may be performed by, as described above, performing template matching to sort the MVD sign list and selecting the MVD sign of the current block from the sorted MVD sign list based on the MVD sign index (or MVD sign prediction index) (e.g., mvd_sign_pair_idx).

As with FIG. 12, the above-described MVD determination method may be performed individually for each reference picture list or prediction direction using the mvd_coding syntax. An example of the mvd_coding syntax structure applicable to Embodiment 2 of the present disclosure is as shown in Table 5 below. Hereinafter, descriptions of the contents overlapping with Tables 3 and 4 described above will be omitted, and the differences will be mainly explained.

TABLE 5

| | Descriptor |
|---|---|
| mvd_coding( x0, y0, refList, cpIdx ) { | |
| abs_mvd_greater0_flag[ 0 ] | ae(v) |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| } | |
| if(abs_mvd_greater0_flag[ 1 ]‖abs_mvd_greater0_flag[ 1 ]) { | |
| mvd_sign_pair_idx | ae(v) |
| } | |
| } | |
| } | |

Referring to Table 5, the mvd_coding syntax may not include the syntax element mvd_sign_flag indicating the sign of each component of the MVD, unlike Table 3 described above. This is because the MVD sign prediction process in Embodiment 2 of the present disclosure may be performed even when the reference picture is resampled.

The mvd_coding syntax may include a syntax element mvd_sign_pair_idx indicating the MVD sign of the current block among the MVD sign candidates, mvd_sign_pair_idx may be signaled only when at least one of the absolute values of the components of the MVD is greater than 0 (i.e., (abs_mvd_greater0_flag[1]||abs_mvd_greater0_flag[1])= true). Meanwhile, mvd_sign_pair_idx may be signaled regardless of whether the reference picture is resampled (i.e., isRPR(refList, ref_idx_lx), unlike Table 4 described above. This is because the MVD sign prediction process using mvd_sign_pair_idx in Embodiment 2 of the present disclosure may be performed even when the reference picture is resampled.

mvd_sign_pair_idx may be encoded based on fixed length coding (FLC), variable length coding (VLC), or arithmetic coding. In one embodiment, if the reference picture of the current block is resampled, only fixed length coding (FLC) may be restricted to be used for encoding mvd_sign_pair__idx. Furthermore, in one embodiment, mvd_sign_pair_idx may be allocated a different number of coding bits according to the number of components greater than 0 among the absolute values of the components of the MVD are greater than 0. For example, if the absolute values of the x and components of the MVD are both greater than 0, 2 bits may be allocated to mvd_sign_pair_idx to indicate one of the four MVD sign candidates. In contrast, if only one of the absolute values of the x and y components of the MVD is greater than 0, 1 bit may be allocated to mvd_sign_pair_idx to indicate one of the two MVD sign candidates for the component greater than 0. In this way, by adaptively controlling the number of coding bits of mvd_sign_pair_idx based on the absolute value (or magnitude) of each component of the MVD, the number of bits may be reduced and encoding efficiency can be further improved. An example of the mvd_coding syntax structure that considers the adaptive control of the number of coding bits is as shown in Table 6 below.

TABLE 6

| | Descriptor |
|---|---|
| mvd_coding( x0, y0, refList, cpIdx ) { | |
| abs_mvd_greater0_flag[ 0 ] | ae(v) |
| abs_mvd_greater0_flag[ 1 ] | ae(v) |
| if( abs_mvd_greater0_flag[ 0 ] ) | |
| abs_mvd_greater1_flag[ 0 ] | ae(v) |
| if( abs_mvd_greater0_flag[ 1 ] ) | |
| abs_mvd_greater1_flag[ 1 ] | ae(v) |
| if( abs_mvd_greater0_flag[ 0 ] ) { | |
| if( abs_mvd_greater1_flag[ 0 ] ) | |
| abs_mvd_minus2[ 0 ] | ae(v) |
| mvd_sign_pair_idx[ 0 ] | ae(v) |
| } | |
| if( abs_mvd_greater0_flag[ 1 ] ) { | |
| if( abs_mvd_greater1_flag[ 1 ] ) | |
| abs_mvd_minus2[ 1 ] | ae(v) |
| mvd_sign_pair_idx[ 1 ] | ae(v) |
| } | |
| } | |

Referring to Table 6 mvd_sign_pair_idx may be signaled individual for each component of MVD. Then, based on mvd_sign_pair_idx for each component of MVD (i.e., mvd_sign_pair_idx[0] and mvd_sign_pair_idx[1]), one mvd_sign_pair_idx used for MVD sign prediction may be derived (e.g., mvd_sign_pair_idx=mvd_sign_pair_idx[0]+ mvd_sign_pair_idx[1]).

Figure 15:
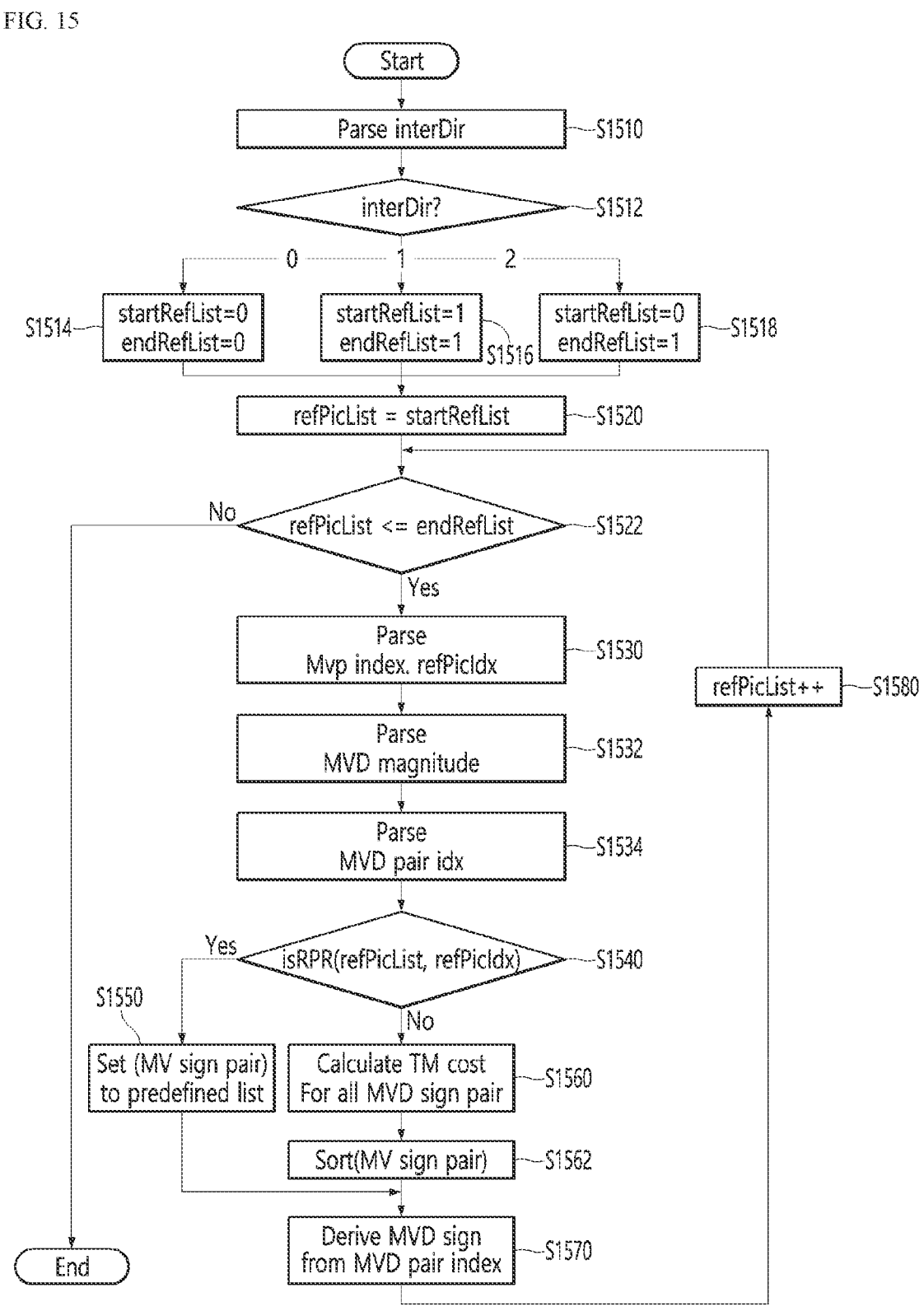

A specific example of a method of determining an MVD based on the syntax structure of Table 5 or Table 6 is as illustrated in FIG. 15. Each step of FIG. 15 may be performed by the image decoding apparatus 200.

Referring to FIG. 15, the image decoding apparatus 200 may obtain inter prediction direction information (e.g., inter_pred_idc) of a current block from a bitstream (S1510), and determine an inter prediction direction of the current block based on the obtained information (S1512).

If the obtained information indicates L0 prediction ('0' of S1512), the image decoding apparatus 200 may set variables startRefList and endRefList to 0, respectively (S1514). Alternatively, if the obtained information indicates L1 prediction ('1' of S1512), the image decoding apparatus 200 may set the control variables startRefList and endRefList to 1, respectively (S1516). Alternatively, if the obtained information indicates BI prediction ('2' of S1512), the image decoding apparatus 200 may set the control variable startRefList to 0 and the control variable endRefList to 1 (S1518).

The image decoding apparatus 200 initializes the variable refPicList representing the reference picture list of the current block to the same value as the control variable startRefList (S1520), and determines whether the variable refPicList is less than or equal to the control variable endRefList (S1522) to determine whether to perform a subsequent process.

As a result of the determination in step S1522, if the variable refPicList is less than or equal to the control variable endRefList ('YES' of S1522), the image decoding apparatus 200 may obtain an MVP index indicating one candidate included in the MVP candidate list and a reference picture index (e.g., refPicIdx) from the bitstream (S1530), and obtain information about the MVD magnitude (e.g., abs_mvd_greater0_flag, etc.) described above from the bitstream with reference to Table 5 (S1532). In addition, the image decoding apparatus 200 may obtain an MVD sign index (e.g., mvd_sign_pair_idx) described above from the bitstream with reference to Table 5 (S1534). The MVD sign index may be obtained from the bitstream regardless of whether the reference picture is resampled, and in this respect, it may be different from the MVD sign determination method according to Embodiment 1 of the present disclosure (FIG. 14). Then, the image decoding apparatus 200 may determine whether the reference picture of the current block specified by the reference picture list and the reference picture index has been resampled (S1540).

As a result of the determination in step S1540, if the corresponding reference picture is resampled (e.g., isRPR (refPicList, refPicIdx)=true) ('YES' of S1540), the image decoding apparatus 200 may set the MVD sign list to a predefined MVD sign list (S1550). An example of the predefined MVD sign list is as shown in Table 7 below.

TABLE 7

| Index | MVD sign pair |
|---|---|
| 0 | (0, 0) |
| 1 | (0, 1) |
| 2 | (1, 0) |
| 3 | (1, 1) |

In contrast, if the reference picture is not resampled (e.g., isRPR(refPicList, refPicIdx)=false) ('NO' of S1540), the image decoding apparatus 200 may perform template matching to sort the MVD sign list. Specifically, the image decoding apparatus 200 may calculate a template matching cost for all MVD sign candidates in the MVD sign list (S1560) and sort the MVD sign candidates based on the calculated template matching cost (S1564). In one example, the sorting may be performed in ascending order of the template matching cost. That is, a smaller index value may be assigned to a lower template matching cost in the MVD sign list. Meanwhile, for MVD sign candidates with the same template matching cost, the original order may be applied without change, or a predefined order (e.g., (0, 0)→(0, 1)→(1, 0)→(1, 1)) may be applied.

The image decoding apparatus 200 may derive the MVD sign of the current block by selecting one candidate from the MVD sign list based on the MVD sign index (e.g., mvd_sign_pair_idx) obtained in step S1534 (S1570). If the reference picture is resampled, the MVD sign list used for deriving the MVD sign may be the MVD sign list set in step S1550. In contrast, if the reference picture is not resampled, the MVD sign list used for deriving the MVD sign may be the MVD sign list sorted in steps S1560 and S1562.

When the process (S1530 to S1570) is completed, the image decoding apparatus 200 may return to step S1522 and repeat the above-described process for the remaining reference picture list, after increasing the variable refPicList by 1 (S1580).

Meanwhile, as a result of the determination in step S1522, if the above-described variable refPicList is greater than the above-described control variable endRefList ('NO' of S1522), the image decoding apparatus 200 may determine that the MVD sign has been determined for all reference picture lists or prediction directions of the current block and terminate all of the above-described processes.

As described above, according to Embodiment 2 of the present disclosure, the MVD sign prediction process may be performed even if the reference picture of the current block is resampled. However, the sorting of the MVD sign list based on template matching may be performed only when the corresponding reference picture is not resampled. Accordingly, the problem of increased throughput and decreased accuracy caused by performing the sorting of the MVD sign list based on template matching for the RPR reference picture can be solved.

Hereinafter, with reference to FIGS. 16 and 17, an image encoding/decoding method according to an embodiment of the present disclosure will be described in detail.

FIG. 16 is a flowchart illustrating an image encoding method according to one embodiment of the present disclosure. The image encoding method of FIG. 16 may be performed by the image encoding apparatus 100 of FIG. 2.

Referring to FIG. 16, the image encoding apparatus 100 may generate a prediction sample of a current block by deriving a motion vector and reference picture of the current block and performing inter prediction based on the derived motion vector and reference picture (S1610).

In order to encode inter prediction information of the current block, a motion vector difference (MVD) of the current block may be derived based on the motion vector of the current block and a motion vector predictor (MVP) (S1620). Then, inter prediction information including information about the magnitude and sign of the derived MVD may be encoded in a bitstream (S1630).

Information about the sign of the MVD may be determined differently based on whether the reference picture is resampled. At least one of the various embodiments of the present disclosure may be applied to determine information about the sign of the MVD.

In one embodiment, based on the reference picture of the current block being resampled (i.e., reference picture resampling (RPR) case), the information about the sign of the MVD may include an MVD sign flag (e.g., mvd_sign_flag) indicating the sign of the MVD. Alternatively, based on the reference picture being not resampled (i.e., non-RPR case), the information about the sign of the MVD may include an MVD sign index (e.g., mvd_sign_pair_idx) indicating one of the MVD sign candidates included in the MVD sign list.

In another embodiment, the information about the sign of the MVD may include an MVD sign index indicating one of the MVD sign candidates included in the MVD sign list determined based on whether the reference picture is resampled. In this case, the MVD sign candidates included in the MVD sign list may have different sorting orders within the MVD sign list based on whether the reference picture is resampled. Specifically, based on the reference picture of the current block being resampled (i.e., the RPR case), the MVD sign candidates may have a first sorting order predefined within the MVD sign list. An example of the first sorting order is as described above with reference to Table 6. Alternatively, based on r the reference picture of the current block being not resampled (i.e., the non-RPR case), the MVD sign candidates may have a second sorting order determined based on a template matching cost of each of the MVD sign candidates within the MVD sign list. Here, the MVD sign candidates having the second sorting order may mean that the MVD sign list is sorted based on template matching.

FIG. 17 is a flowchart illustrating an image decoding method according to an embodiment of the present disclosure. The image decoding method of FIG. 17 may be performed by the image decoding apparatus 200 of FIG. 3.

Referring to FIG. 17, the image decoding apparatus 200 may determine a motion vector difference (MVD) of a current block (S1710), and derive a motion vector of the current block based on the determined MVD and a motion vector predictor (MVP) of the current block (S1720). Then, the image decoding apparatus 200 may perform inter prediction based on the derived motion vector and a reference picture of the current block, thereby generating a prediction sample of the current block (S1730).

The sign of the MVD may be determined differently based on whether the reference picture is resampled. At least one of the various embodiments of the present disclosure may be applied to determine the sign of the MVD.

In an embodiment, based on the reference picture of the current block being resampled (i.e., the RPR case), the sign of the MVD may be (directly) determined based on an MVD sign flag (e.g., mvd_sign_flag) obtained from a bitstream. Alternatively, based on the reference picture of the current block being not resampled (i.e., the non-RPR case), the sign of the MVD may be derived from a predetermined MVD sign list.

In another embodiment, the code of the MVD may be derived from an MVD sign list that is determined based on whether the reference picture is resampled. In this case, the MVD sign candidates included in the MVD sign list may have different sorting orders within the MVD sign list based on whether the reference picture is resampled. Specifically, based on the reference picture of the current block being resampled (i.e., the RPR case), the MVD sign candidates may have a first sorting order predefined within the MVD sign list. In contrast, based on the reference picture of the current block being not resampled (i.e., the non-RPR case), the MVD sign candidates may have a second sorting order that is determined based on a template matching cost of each of the MVD sign candidates within the MVD sign list.

As described above, according to the image encoding/decoding method according to an embodiment of the present disclosure, the MVD sign and information related thereto may be adaptively determined based on whether a reference picture is resampled. Accordingly, the problem of increased throughput and decreased accuracy occurring in the prediction process of the MVD sign can be solved.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

FIG. 17 is a view showing a content streaming system, to which an embodiment of the present disclosure is applicable.

As shown in FIG. 17, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image decoding method performed by an image decoding apparatus, the image decoding method comprising:

determining a motion vector difference (MVD) of a current block;

deriving a motion vector of the current block based on the determined MVD and a motion vector predictor (MVP) of the current block; and generating a prediction sample of the current block based on the derived motion vector and a reference picture of the current block, wherein a sign of the MVD is determined based on whether the reference picture is resampled.

2. The image decoding method of claim 1, wherein the sign of the MVD is determined based on an MVD sign flag obtained from a bitstream, based on the reference picture being resampled.

3. The image decoding method of claim 1, wherein the sign of the MVD is derived from a predetermined MVD sign list, based on the reference picture being not resampled.

4. The image decoding method of claim 1, wherein the sign of the MVD is derived from an MVD sign list determined based on whether the reference picture is resampled.

5. The image decoding method of claim 4, wherein MVD sign candidates included in the MVD sign list have different sorting orders within the MVD sign list based on whether the reference picture is resampled.

6. The image decoding method of claim 5, wherein the MVD sign candidates have a first sorting order predefined within the MVD sign list, based on the reference picture being resampled.

7. The image decoding method of claim 6, wherein the MVD sign candidates have a second sorting order determined based on a template matching cost of each of the MVD sign candidates within the MVD sign list, based on the reference picture being not resampled.

8. An image encoding method performed by an image encoding apparatus, the image encoding method comprising:

generating a prediction sample of a current block based on a motion vector and reference picture of the current block;

deriving a motion vector difference (MVD) of the current block, based on the motion vector and a motion vector predictor (MVP) of the current block; and encoding inter prediction information including information about a magnitude and sign of the MVD, wherein information about the sign of the MVD is determined based on whether the reference picture is resampled.

9. The image encoding method of claim 8, wherein the information about the sign of the MVD comprises an MVD sign flag indicating the sign of the MVD, based on the reference picture being resampled.

10. The image encoding method of claim 8, wherein the information about the sign of the MVD comprises an MVD sign index indicating one of MVD sign candidates included in a predetermined MVD sign list, based on the reference picture being not resampled.

11. The image encoding method of claim 8, wherein the information about the sign of the MVD comprises an MVD sign index indicating one of MVD sign candidates included in a predetermined MVD sign list, and the MVD sign list is determined based on whether the reference picture is resampled.

12. The image encoding method of claim 11, wherein the MVD sign candidates have different sorting orders within the MVD sign list based on whether the reference picture is resampled.

13. The image encoding method of claim 12, wherein the MVD sign candidates have a first sorting order predefined within the MVD sign list, based on the reference picture being resampled.

14. The image encoding method of claim 13, wherein the MVD sign candidates have a second sorting order determined based on a template matching cost of each of the MVD sign candidates within the MVD sign list, based on the reference picture being not resampled.

15. A method of transmitting a bitstream generated by an image encoding method, the method comprising:

obtaining the bitstream, wherein the bitstream is generated based on generating a prediction sample of a current block based on a motion vector and reference picture of the current block, deriving a motion vector difference (MVD) of the current block, based on the motion vector and a motion vector predictor (MVP) of the current block and encoding inter prediction information including information about a magnitude and sign of the MVD; and transmitting the bitstream;

wherein information about the sign of the MVD is determined based on whether the reference picture is resampled.

* * * * *